Figure 1:
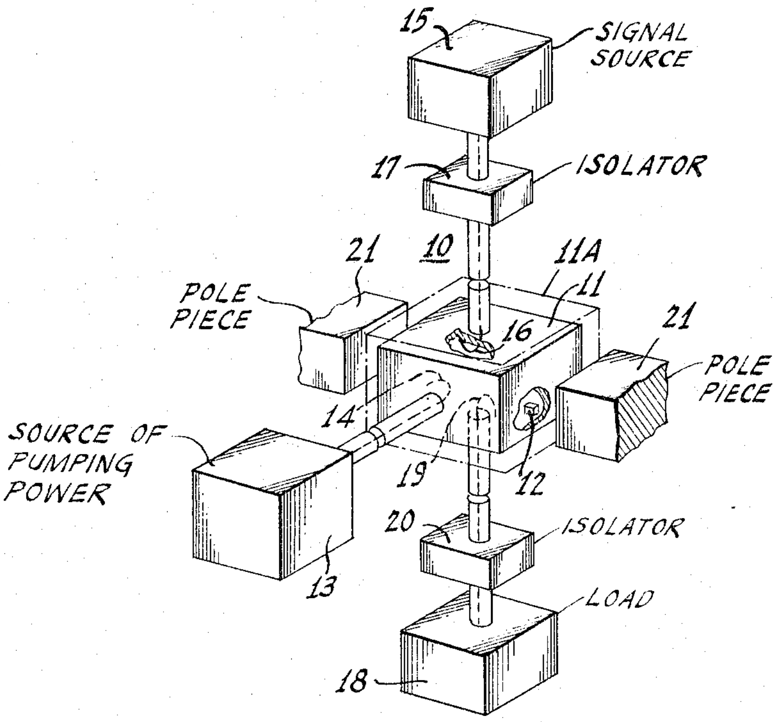

DOUBLY DOPED TITANIUM DIOXIDE MASER ELEMENT

Filed June 20, 1963

INVENTORS
EDWARD S. SABISKY &
HENDRIK J. GERRITSEN
BY
W.S. Hill
AGENT 3,275,558
DOUBLY DOPED TITANIUM DIOXIDE MASER ELEMENT Edward S. Sabisky, Trenton, and Hendrik J. Gerritsen, Princeton, N.J., assignors to Radio Corporation of America, a corporation of Delaware Filed June 20, 1963, Ser. No. 289,332
8 Claims. (Cl. 252—62.5)

This invention relates to an improved solid state maser and to a novel element therefor.

A solid state maser may include a maser element comprising particular paramagnetic cations in a host material, which is often a single crystal. In operation, a population inversion is produced at a particular energy with respect to lower energies in the paramagnetic cations. This population inversion may be achieved by exciting unpaired electrons in the cations, which then tend to accumulate in an energy from which there are relatively long spontaneous relaxation times for transitions to lower energies. This population inversion may be used to produce coherent radiation by stimulating the excited electrons from this higher energy to a particular lower energy and, at the same time, repopulating the higher energy at the same rate.

In many cases, it is desirable to shorten the spontaneous relaxation time of a particular transition so that another transition may be used to produce the coherent radiation. One method for shortening the relaxation time is to include in the maser element another cation which is suitably matched to the paramagnetic cations and the host material. This other cation is referred to as an idler dopant. Combinations of an idler dopant and a paramagnetic cation in a host material have been demonstrated to emit coherently at frequencies below 50 kilomegacycles.

An object of this invention is to provide an improved maser.

Another object is to provide a novel maser element including an idler dopant.

A feature of the invention is a novel composition comprising titanium dioxide containing 0.001 to 0.5 mol percent erbium or cobalt and 0.001 to 0.5 mol percent of at least one member of the group consisting of chromium, iron, manganese and nickel. A preferred composition for use as a maser element comprises a single crystal of titanium dioxide (rutile) containing 0.005 to 0.2 mol percent trivalent erbium $Er^{3+}$ or divalent cobalt $Co^{2+}$ as the idler dopant, and 0.005 to 0.2 mol percent of at least one paramagnetic cation of the group consisting of trivalent chromium $Cr^{3+}$, trivalent iron $Fe^{3+}$, trivalent manganese $Mn^{3+}$ and divalent nickel $Ni^{2+}$. By using trivalent erbium or divalent cobalt as an idler dopant, the gain band width product of the maser using this element is increased and the receiver recovery time is decreased. Also, in various push-pull and push-push modes of operation, the output or signal frequency may be higher than the pump frequency.

Figure 2:
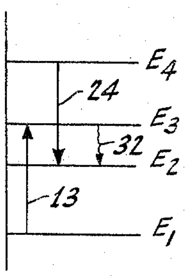
Figure 3:
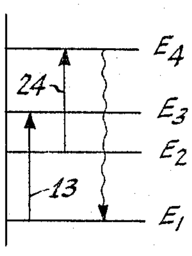
Figure 4:
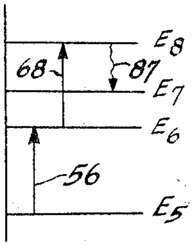
Figure 5:
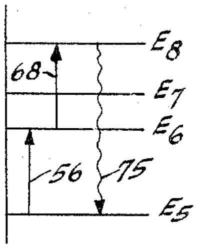

A more detailed description of the invention and illustrative embodiments thereof appear below in conjunction with the drawing in which:

FIGURE 1 is a perspective view of a typical resonant cavity type maser,

FIGURE 2 is an energy level diagram for a maser element of the prior art suitable for push-pull operation, FIGURE 3 is an energy level diagram of a maser element according to the invention suitable for push-pull operation, FIGURE 4 is an energy level diagram for a maser element of the prior art suitable for push-push operation, and, FIGURE 5 is an energy level diagram maser element of the invention suitable for push-push operation.

A maser according to the invention comprises a maser element, means for applying a substantially constant magnetic field to the maser element, means for pumping the maser element at microwave frequencies, and means for deriving an output of microwave energy from the element. Where the maser is used as an amplifier, the maser includes also means for applying a microwave signal to the maser element. The maser may be of the resonant cavity type, as exemplified by the apparatus described in U.S. Patent 3,001,141 issued September 19, 1961, to R. C. Fletcher et al.; or may be of the traveling wave type as exemplified by the apparatus described in U.S. Patent 3,004,225, issued October 10, 1961, to R. W. De Grasse et al.

FIGURE 1 illustrates a resonant cavity type maser 10. The maser 10 comprises a cavity 11 which is resonant at a pair of frequencies, one of which couples to the pumping frequency $f_p$ and the other to the signal frequency $f_{sig}$. The cavity houses a maser element 12 which is described in detail below. It is advantageous, generally, to provide means for maintaining the maser element at a low temperature, for example, close to that of liquid helium, or liquid neon. Typically, the cavity is enclosed within a suitable refrigerating apparatus 11A which is shown schematically in the interest of simplicity.

Pumping power of appropriate frequency $f_p$ is applied to the cavity 11 from a local oscillator 13 by way of a coupling loop 14 in a manner known to workers in the art for exciting the corresponding resonant mode of the cavity 11. Input signal power of appropriate frequency $f_{sig}$ is supplied to the cavity 11 from a signal source 15 by way of a coupling loop 16. It is desirable to include a signal source isolator 17 in the signal path intermediate between the input signal source 15 and the cavity 11 to minimize the transfer of power from the cavity 11 to the source 15.

Output power is abstracted from the cavity 11 for use by a load 18, which in some instances may be another maser, by a coupling loop 19. It may be desirable to include a load isolator 20 along the signal path intermediate between the load 18 and the cavity 11 to minimize the reflection of power from the load 18 back into the cavity 11. Such load isolater 20 is also advantageously maintained at a low temperature in the interest of generating low noise.

Each of the loops 16 and 19 for the signal input and for the output is arranged at the signal frequency $f_{sig}$ in a manner known to workers in the maser art. Alternatively, there may be only a single coupling loop to the cavity 11 which leads to one arm of a circulator, other arms of which are connected to the signal source and to the load respectively in a manner known to workers in the maser art. Similarly, only a single signal output coupling loop may be used if the maser is employed as an oscillator. In such operation, noise arising in the walls of the cavity 11 stimulates from the maser element 12 the emission of radiation which gives rise to oscillations.

There is applied to the maser element 12 a steady or substantially constant magnetic field H which produces Zeeman splitting of the energies of the electron spin population of the material of the maser element 12. The substantially constant magnetic field may be produced, for example, from pole pieces 21 which are shown broken away in FIGURE 1.

The maser element 12 comprises a single crystal of rutile $TiO_2$ containing between 0.005 to 0.2 mol percent of trivalent erbium $Er^{3+}$ or divalent cobalt $Co^{2+}$ and between 0.005 to 0.2 mol percent of at least one member of the group of paramagnetic cations consisting of trivalent chromium $Cr^{3+}$, trivalent iron $Fe^{3+}$, trivalent manganese $Mn^{3+}$, and divalent nickel, $Ni^{2+}$. It is preferred to employ only one member of the foregoing group of paramagnetic cations. The maser element may be prepared by crystal growing techniques known in the art. By a preferred technique, powdered material of the desired composition is converted to a single crystal by the flame fusion method. Alternatively, single crystals may be grown by feeding powdered material of the desired composition in an arc image furnace.

Trivalent erbium $Er^{3+}$ or divalent cobalt $Co^{2+}$ may be used as the idler dopant in rutile because of their very short spin lattice relaxation times. At 4.2° K., the relaxation time of $Er^{3+}$ was measured to be 100 to 1000 times shorter than that of each of the cations mentioned above. $Co^{2+}$ has very short relaxation times in the temperature range between 10° to 30° K.

The reason that the cations $Cr^{3+}$, $Fe^{3+}$, $Mn^{3+}$, $Ni^{2+}$ are useful as maser ions at short wavelengths is due to their large zero field splittings. The zero field splittings are:

$Cr^{3+}$: 43.3 kmc.
$Fe^{3+}$: 43.3; 81.3 and 124.6 kmc.
$Ni^{2+}$: 8.2; 250 and 258.2 kmc.
$Mn^{3+}$: 3.1; 20.8; 114; 362 kmc. etc.

In addition to operation at very high frequencies using push-push or push-pull schemes, idler doping is also important for improving the operation of the normal operating maser. Some improvements achieved by idler doping are: larger inversion or larger gain, a decreased recovery time of a receiver using a maser after being saturated, and the possibility of maser operation near the pumping frequency.

FIGURES 2 and 3 are energy level diagrams of four-level maser elements illustrating an energy level system capable of operation in push-pull. FIGURE 2 represents $TiO_2:Fe^{3+}$ with no idler dopant, while FIGURE 3 represents $TiO_2:Fe^{3+}:Er^{3+}$. There are depicted in FIGURES 2 and 3 energy levels E1, E2, E3 and E4. The higher the subscript, the higher the energy of the level. As shown, the energy separation of levels E1 and E3 is substantially equal to the energy separation of levels E2 and E4. Saturating pump power of frequency equal to E3 minus E1 raises the energy of unpaired electrons in paramagnetic cations of the maser element as indicated by the arrows 13 and 24 to E4. As shown in FIGURE 2, in maser elements with no idler dopant present, a population inversion occurs at level E3 with respect to level E2, since the relaxation time from E3 to lower energies is relatively long. Coherent radiation may be produced by stimulating the transition of electrons between levels E3 and E2 as indicated by the arrow 32 with energy of a frequency E3 minus E2. The frequency of the coherent emission corresponds to E3 minus E2, which is a lower frequency than the frequency $f_p$ of the pumping power. For example, a single crystal maser element having the composition $TiO_2$:0.0005 $Fe^{3+}$ at liquid helium temperature in a D.C. magnetic field of 7 kg. (kilogauss) applied along the [100] direction of the maser element may be pumped at about 78.2 kmc. to emit a coherent signal at about 57 kmc.

As shown in FIGURE 3, when trivalent erbium is introduced into the same system as shown in FIGURE 2, the energy levels E1, E2, E3, and E4 remain substantially the same, but the apparent relaxation time of the E3 to E2 transition is shortened substantially. By shortening the relaxation time of the transition betwen levels E3 and E2, a population inversion may be produced at level E4 with respect to level E1. Coherent radiation of frequency E4 minus E1 may be produced from the maser element by stimulating the transition between E4 and E1, as indicated by the arrow 41. This radiation has a frequency greater than the pumping frequency. For example, a maser element having the approximate composition $TiO_2$:0.0004 $Er^{3+}$:0.0005 $Fe^{3+}$ at liquid helium temperature in a D.C. magnetic field of about 7 kg. may be pumped at 78.2 kmc. to emit a coherent 110 kmc. signal.

In another example of four level maser elements suitable for push-pull operation, as described with respect to FIGURES 2 and 3, the maser element comprises a single crystal of $TiO_2$:0.0005 $Fe^{3+}$ with no idler dopant. This maser element at liquid helium temperature in a D.C. magnetic field of about 3.5 kg. applied parallel to a direction which is about 45° from the c-axis in the (011) crystallographic plane may be pumped at about 50 kmc., to emit a coherent signal at about 35 kmc. A similar element of approximately $TiO_2$:0.0005 $Fe^{3+}$:0.0004 $Er^{3+}$ at liquid helium temperature in the same magnetic field may be pumped at about 50 kmc. to emit a coherent signal at about 80 kmc.

In an example of a five level maser element suitable for push-pull operation, the maser element comprises a single crystal of about $TiO_2$:0.0006 $Mn^{3+}$ with no idler dopant. This maser element at liquid helium temperatures in a D.C. field of about 24 kg. applied parallel to the $z$ axis of the crystal may be pumped at about 360 kmc. to emit a coherent signal at about 160 kmc. A similar element of $TiO_2$:0.0006 $Mn^{3+}$:0.0005 $Co^{2+}$ at temperatures between 10° and 30° K. in the same magnetic field may be pumped at about 360 kmc. to emit a coherent signal at about 660 kmc.

FIGURES 4 and 5 are energy level diagrams for four-level maser elements capable of operation in push-push. In this system, E6 minus E5 equals E8 minus E6. Saturating pump power of frequency $f_p$ equal to E6 minus E5 raises the energy of unpaired electrons in paramagnetic cations in the maser element as indicated by the arrows 56 and 68. As shown in FIGURE 4, in a maser element with no idler dopant, a population inversion occurs between levels E8 and E7 because the relaxation time to the lower energies is relatively long. Coherent radiation may be produced by stimulating the transitions between levels E8 and E7, as indicated by the arrow 87, to yield an output signal having a frequency $f_{sig}$ equal to E8 minus E7. For example, a maser element having the composition $TiO_2$:0006 $Mn^{3+}$ at liquid helium temperature in a D.C. magnietic field of about 10 kg. along the [001] crystallographic direction may be pumped at about 110 kmc. to emit a coherent signal having a frequency at about 51 kmc.

As shown in FIGURE 5, when trivalent erbium is introduced into the same system, the energy levels remain substantially the same but the relaxation time of the E8 to E7 transition is now shortened by the erbium and inversion may be produced at level E7 with respect to the level E5. Coherent radiation of frequency E7 minus E5 may be produced by stimulating the transition between the levels E7 and E5, as indicated by the arrow 75. This coherent radiation has a frequency $f_{sig}$ greater than the pump frequency $f_p$. For example, a maser element having the approximate composition $TiO_2$:0.0003 $Er^{3+}$: 0.0003 $Mn^{3+}$ at temperatures between 10° and 30° K. may be pumped at about 110 kmc. in a D.C. magnetic field of about 10 kg. along the [001] crystallographic direction to emit a signal at a frequency of about 168 kmc.

In an example of a three level maser element suitable for push-push operation, the maser element comprises a single crystal of $TiO_2$:0.0005 $Cr^{3+}$ with no idler dopant. This maser element at liquid helium temperatures in a D.C. magnetic field of about 3.5 kg. applied 10° from the [110] axis in the [110] plane of the crystal may be pumped at about 33.5 kmc. to emit a coherent signal at about 9.5 kmc. A similar element of about $TiO_2$:0.0005 $Cr^{3+}$:0.0005 $Co^{2+}$ at temperatures between 10° and 30° K. may be pumped at about 33.5 kmc. to emit a coherent signal at about 24.0 kmc. Thus, by using $Co^{2+}$ as an idler dopant, the maser has about the same gain but more than two times the signal frequency than a corresponding maser with no idler dopant.

What is claimed is:

1. A composition of matter consisting essentially of titanium dioxide containing between 0.001 to 0.5 mol percent of one member of the group consisting of $Er^{3+}$ and $Co^{2+}$ and between 0.001 to 0.5 mol percent of at least one member of the group consisting of $Cr^{3+}$, $Fe^{3+}$, $Ni^{2+}$ and $Mn^{3+}$.

2. A composition of matter consisting essentially of titanium dioxide containing between 0.001 to 0.5 mol percent $Er^{3+}$ and between 0.001 to 0.5 mol percent of one member of the group consisting of $Cr^{3+}$, $Fe^{3+}$, $Ni^{2+}$ and $Mn^{3+}$.

3. A maser element comprising a single crystal body consisting essentially of titanium dioxide containing between 0.001 to 0.5 mol percent of one member of the group consisting of $Er^{3+}$ and $Co^{2+}$ and between 0.001 to 0.5 mol percent of at least one member of the group consisting of $Cr^{3+}$, $Fe^{3+}$, $Ni^{2+}$ and $Mn^{3+}$.

4. A maser element comprising a single crystal body consisting essentially of titanium dioxide containing between 0.001 to 0.5 mol percent of one member of the group consisting of $Er^{3+}$ and $Co^{2+}$ and between 0.001 to 0.5 mol percent of one member of the group consisting of $Cr^{3+}$, $Fe^{3+}$, $Ni^{2+}$, and $Mn^{3+}$.

5. A composition of matter consisting essentially of titanium dioxide containing between 0.001 to 0.5 mol percent of one member of the group consisting of trivalent erbium and divalent cobalt and between 0.001 to 0.5 mol percent trivalent chromium.

6. A composition of matter consisting essentially of titanium dioxide containing between 0.001 to 0.5 mol percent of one member of the group consisting of trivalent erbium and divalent cobalt and between 0.001 to 0.5 mol percent trivalent iron.

7. A composition of matter consisting essentially of titanium dioxide containing between 0.001 to 0.5 mol percent of one member of the group consisting of trivalent erbium and divalent cobalt and between 0.001 to 0.5 mol percent divalent nickel.

8. A composition of matter consisting essentially of titanium dioxide containing between 0.001 to 0.5 mol percent of one member of the group consisting of trivalent erbium and divalent cobalt and between 0.001 to 0.5 mol percent trivalent manganese.

References Cited by the Examiner

UNITED STATES PATENTS 3,001,141 9/1961 Fletcher et al. ---------- 330—4

OTHER REFERENCES

Chester: "Cross-Doping Agents for Rutile Masers," Journal of Applied Physics, May 1961, pp. 866–8.

Foner et al.: "CW Millimeter Wave Maser Using $Fe^{3+}$ in $TiO_2$," Journal of Applied Physics, April 1960, pp. 742–3.

TOBIAS E. LEVOW, *Primary Examiner*.

MAURICE A. BRINDISI, SAMEUL H. BLECH, *Examiners*.

R. D. EDMONDS, *Assistant Examiner*.

UNITED STATES PATENT OFFICE
CERTIFICATE OF CORRECTION

Patent No. 3,275,558 September 27, 1966

Edward S. Sabisky et al.

It is hereby certified that error appears in the above numbered patent requiring correction and that the said Letters Patent should read as corrected below.

Column 3, line 57, for "[100]" read -- [110] --; column 4, line 39, for "$TiO_2$:0006 $Mn^{3+}$" read -- $TiO_2$:0.0006 $Mn^{3+}$ --.

Signed and sealed this 29th day of August 1967.

(SEAL)
Attest:

ERNEST W. SWIDER
Attesting Officer

EDWARD J. BRENNER
Commissioner of Patents